US008332222B2

(12) United States Patent
Chung et al.

(10) Patent No.: US 8,332,222 B2
(45) Date of Patent: Dec. 11, 2012

(54) VITERBI DECODER AND SPEECH RECOGNITION METHOD USING SAME USING NON-LINEAR FILTER FOR OBSERVATION PROBABILITIES

(75) Inventors: Hoon Chung, Daejeon (KR); Jeon Gue Park, Daejeon (KR); Yunkeun Lee, Daejeon (KR); Ho-Young Jung, Daejeon (KR); Hyung-Bae Jeon, Daejeon (KR); Jeom Ja Kang, Daejeon (KR); Sung Joo Lee, Daejeon (KR); Euisok Chung, Daejeon (KR); Ji Hyun Wang, Daejeon (KR); Byung Ok Kang, Daejeon (KR); Ki-young Park, Daejeon (KR); Jong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 812 days.

(21) Appl. No.: 12/506,719

(22) Filed: Jul. 21, 2009

(65) Prior Publication Data
US 2010/0161329 A1 Jun. 24, 2010

(30) Foreign Application Priority Data
Dec. 22, 2008 (KR) ........................ 10-2008-0131365

(51) Int. Cl.
*G10L 15/00* (2006.01)
(52) U.S. Cl. ......... 704/242; 704/240; 375/341; 714/795
(58) Field of Classification Search .................. None
See application file for complete search history.

(56) References Cited

U.S. PATENT DOCUMENTS

| 5,793,891 | A  | * | 8/1998  | Takahashi et al. ............. 382/228 |
| 6,389,574 | B1 |   | 5/2002  | Belveze et al. |
| 7,516,069 | B2 | * | 4/2009  | Bernard et al. ............... 704/233 |
| 7,617,098 | B2 | * | 11/2009 | Deng et al. .................... 704/226 |
| 2002/0103639 | A1 |   | 8/2002  | Chang et al. |
| 2005/0228662 | A1 | * | 10/2005 | Bernard et al. ............... 704/233 |

(Continued)

FOREIGN PATENT DOCUMENTS

KR    10-2005-0063987    6/2005

OTHER PUBLICATIONS

Ming et al. "Interframe dependent hidden Markov model for speech recognition" 1994.*

(Continued)

*Primary Examiner* — Greg Borsetti
(74) *Attorney, Agent, or Firm* — Staas & Halsey LLP

(57) ABSTRACT

A Viterbi decoder includes: an observation vector sequence generator for generating an observation vector sequence by converting an input speech to a sequence of observation vectors; a local optimal state calculator for obtaining a partial state sequence having a maximum similarity up to a current observation vector as an optimal state; an observation probability calculator for obtaining, as a current observation probability, a probability for observing the current observation vector in the optimal state; a buffer for storing therein a specific number of previous observation probabilities; a non-linear filter for calculating a filtered probability by using the previous observation probabilities stored in the buffer and the current observation probability; and a maximum likelihood calculator for calculating a partial maximum likelihood by using the filtered probability. The filtered probability may be a maximum value, a mean value or a median value of the previous observation probabilities and the current observation probability.

5 Claims, 3 Drawing Sheets

U.S. PATENT DOCUMENTS

2007/0055508 A1* 3/2007 Zhao et al. .................. 704/226
2007/0140164 A1 6/2007 Zeng et al.

OTHER PUBLICATIONS

Bernard et al. "Source and channel coding for low-bitrate distributed speech recognition systems" 2001.*

Arrowood et al. "Using Observation Uncertainty in HMM Decoding" 2002.*

Cui et al. "A Noise-Robust ASR Back-end Technique Based on Weighted Viterbi Recognition" 2003.*

Bernard et al. "Joint Channel Decoding—Viterbi Recognition for Wireless Applications" 2001.*

Tan et al. "Robust Speech Recognition over Mobile Networks Using Combined Weighted Viterbi Decoding and Subvector Based Error Concealment" 2006.*

Tan et al. "Exploiting Temporal Correlation of Speech for Error Robust and Bandwidth Flexible Distributed Speech Recognition" May 2007.*

Markov et al. "Modeling Successive Frame Dependencies With Hybrid HMM/BN Acoustic Model" 2005.*

Bernard et al. "Source and Channel Coding for Speech Transmission and Remote Speech Recognition" 2002.*

Hanna et al. "Inter-frame dependence arising from preceding and succeeding frames—Application to speech recognition".*

"Low-Bitrate Distributed Speech Recognition for Packet-Based and Wireless Communication", Alexis Bernard et al., IEEE Transactions on Audio, Speech, and Language Processing, vol. 10, pp. 570-579, 2003.

* cited by examiner

VITERBI DECODER AND SPEECH RECOGNITION METHOD USING SAME USING NON-LINEAR FILTER FOR OBSERVATION PROBABILITIES

CROSS-REFERENCE(S) TO RELATED APPLICATION(S)

The present invention claims priority of Korean Patent Application No. 10-2008-0131365, filed on Dec. 22, 2008, which is incorporated herein by reference.

FIELD OF THE INVENTION

The present invention relates to speech recognition; and, more particularly, to a Viterbi decoder and a speech recognition method using the Viterbi decoder, which can prevent a rapid decrease in observation probabilities even if a speech signal includes impulse noises.

BACKGROUND OF THE INVENTION

Speech recognition (voice recognition) is a computer technology for converting an acoustic signal, e.g., a voice signal obtained through a microphone or a telephone, into a corresponding text, e.g., a word, word sets and sentences. Among a variety of speech recognition algorithms, the most widely used one is HMM (Hidden Markov Model) based speech recognition. The HMM based speech recognition is a stochastic speech recognition algorithm including two independent processes, i.e., a training process and a recognition process.

In the training process, acoustic features of a target word are stochastically modeled. In the recognition process, similarities between an input speech signal and trained models are measured to output, as recognition result, a word corresponding to a model having the maximum similarity or a word corresponding to a state sequence forming a model.

FIG. 1 illustrates a block diagram of a conventional HMM (Hidden Markov Model) based speech recognition system 100. The speech recognition system 100 may include a Viterbi decoder, a word model management unit 120, an acoustic model unit 130 and a dictionary unit 140.

The acoustic model unit 130 manages trained and mathematically modeled phoneme models which are basic units in speech recognition.

The dictionary unit 140 provides phonetic sequences for recognition target words.

The word model management unit 120 manages, based on the phoneme models, word models corresponding to the recognition target words. The word models are configured with reference to the phonetic sequences of the recognition target words provided by the dictionary unit 140.

The Viterbi decoder 140 measures similarities between an observation vector sequence and the word models managed by the word model management unit 120 to output as recognition results a word having the maximum similarity. Here, the Viterbi decoder 140 measures similarity between a speech signal and a recognition model (trained model) by using Viterbi algorithm.

The Viterbi algorithm presents a dynamic programming solution to find the most likely path. A partial maximum likelihood $\delta_t(j)$ of a state j at a time t is recursively calculated using Equation 1:

$$\delta_t(j) = \max_i \lfloor \delta_{t-1}(i) \cdot \alpha_{ij} \rfloor \cdot b_j(o_t), \qquad \text{Equation 1}$$

wherein $\alpha_{ij}$ is a transition probability to the state j from a state i, and $b_j(o_t)$ is an observation probability in the state j to output an observation vector $o_t$ at the time t.

For a speech signal including impulse noises, observation probabilities for observation vectors including the noises are in general much lower than those for noise-free observation vectors, which results in dispersion of partial maximum likelihoods and increase of erroneous recognition results. In order to obtain stable recognition results from a speech signal including impulse noises, modified Viterbi algorithms have been proposed. The partial maximum likelihood $\delta_t(i)$ according to the modified Viterbi algorithms is calculated by using Equation 2:

$$\delta_t(j) = \max_i \lfloor \delta_{t-1}(i) \cdot a_{ij} \rfloor \cdot f_j(t), \qquad \text{Equation 2}$$

wherein $f_j(t)$ is a function for an observation probability $b_j(o_t)$.

Among the modified Viterbi algorithms, the most widely used one is weighted Viterbi algorithm. The function $f_j(t)$ of the weighted Viterbi algorithm is as in Equation 3:

$$f_j(t) = b_j(o_t)^{\gamma_t}, \qquad \text{Equation 3}$$

wherein a weight $\gamma_t$ represents reliability of the observation vector $o_t$. The weight $\gamma_t$ is in a range from 0 to 1.0 and increases in proportion to the observation probability $b_j(o_t)$, thus minimizing the erroneous recognition results due to the noises. In general, the reliability is measured using an SNR (Signal-to-Noise Ratio) of a speech period to which a corresponding observation vector belongs.

An alternative of the function $f_j(t)$ is as in Equation 4:

$$f_j(t) = \begin{cases} b_j(o_t) & \text{if } b_j(o_t) \geq T_l \\ T_l & \text{otherwise,} \end{cases} \qquad \text{Equation 4}$$

wherein $T_l$ is a threshold. If the observation probability $b_j(o_t)$ is less than the threshold $T_l$, the observation probability $b_j(o_t)$ is replaced with the threshold $T_l$, thereby preventing an excessive decrease in the observation probability $b_j(o_t)$.

The above-described Viterbi algorithms basically based on observation independence assumption ensure relatively stable recognition performance even in a case where a speech signal includes noises. However, since consecutive frames in a speech signal are closely correlated, more improved recognition performance cannot be achieved via these Viterbi algorithms.

SUMMARY OF THE INVENTION

In view of the above, the present invention provides a Viterbi decoder and a speech recognition method using the Viterbi decoder, which can prevent a rapid decrease in observation probabilities even if a speech signal includes impulse noises.

In accordance with an aspect of the present invention, there is provided a Viterbi decoder, including:

an observation vector sequence generator for generating an observation vector sequence by converting an input speech to a sequence of observation vectors;

a local optimal state calculator for obtaining, among states constituting a hidden Markov model, a partial state sequence having a maximum similarity up to a current observation vector as an optimal state;

an observation probability calculator for obtaining, as a current observation probability, a probability for observing the current observation vector in the optimal state;

a buffer for storing therein a specific number of previous observation probabilities;

a non-linear filter for calculating a filtered probability by using the previous observation probabilities stored in the buffer and the current observation probability; and a maximum likelihood calculator for calculating a partial maximum likelihood by using the filtered probability.

Preferfably, the observation probability calculator updates the buffer using the current observation probability.

Preferably, the non-linear filter calculates, as the filtered probability, a maximum value of the previous observation probabilities stored in the buffer and the current observation probability.

Preferably, the non-linear filter calculates, as the filtered probability, a mean value of the previous observation probabilities stored in the buffer and the current observation probability.

Preferably, the non-linear filter calculates, as the filtered probability, a median value of the previous observation probabilities stored in the buffer and the current observation probability.

Preferably, the non-linear filter calculates the filtered probability by using correlations between the previous observation probabilities stored in the buffer and the current observation probability.

In accordance with another aspect of the present invention, there is provided a speech recognition method using a Viterbi decoder, the method including:

generating an observation vector sequence by converting an input speech to a sequence of observation vectors;

obtaining, among states constituting a hidden Markov model, a partial state sequence having a maximum similarity up to a current observation vector as an optimal state;

obtaining, as a current observation probability, a probability for observing the current observation vector in the optimal state;

calculating a filtered probability by using previous observation probabilities and the current observation probability;

calculating a partial maximum likelihood by using the filtered probability;

updating a cumulative maximum likelihood by using the partial maximum likelihood; and outputting a recognition result for the input speech based on the cumulative maximum likelihood, wherein said obtaining the optimal state, said obtaining the current observation probability, said calculating the filtered probability, said calculating the partial maximum likelihood and said updating the cumulative maximum likelihood are repeated until it reaches the last observation vector in the observation vector sequence.

Preferably, the filtered probability is a maximum value of the previous observation probabilities and the current observation probability.

Preferably, the filtered probability is a mean value of the previous observation probabilities and the current observation probability.

Preferably, the filtered probability is a median value of the previous observation probabilities and the current observation probability.

Preferably, the filtered probability is calculated by using correlations between the previous observation probabilities and the current observation probability.

According to the present invention, a filtered probability calculated based on observation probabilities via a non-linear filtering is used in maximum likelihood calculation instead of an observation probability. Therefore, side-effects of impulse noises on the speech recognition can be reduced.

Further, correlation between consecutive frames in an input speech signal is taken into consideration during the non-linear filtering. Therefore, more improved recognition performance can be achieved.

BRIEF DESCRIPTION OF THE DRAWINGS

The above features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings, which form a part hereof.

Figure 2:
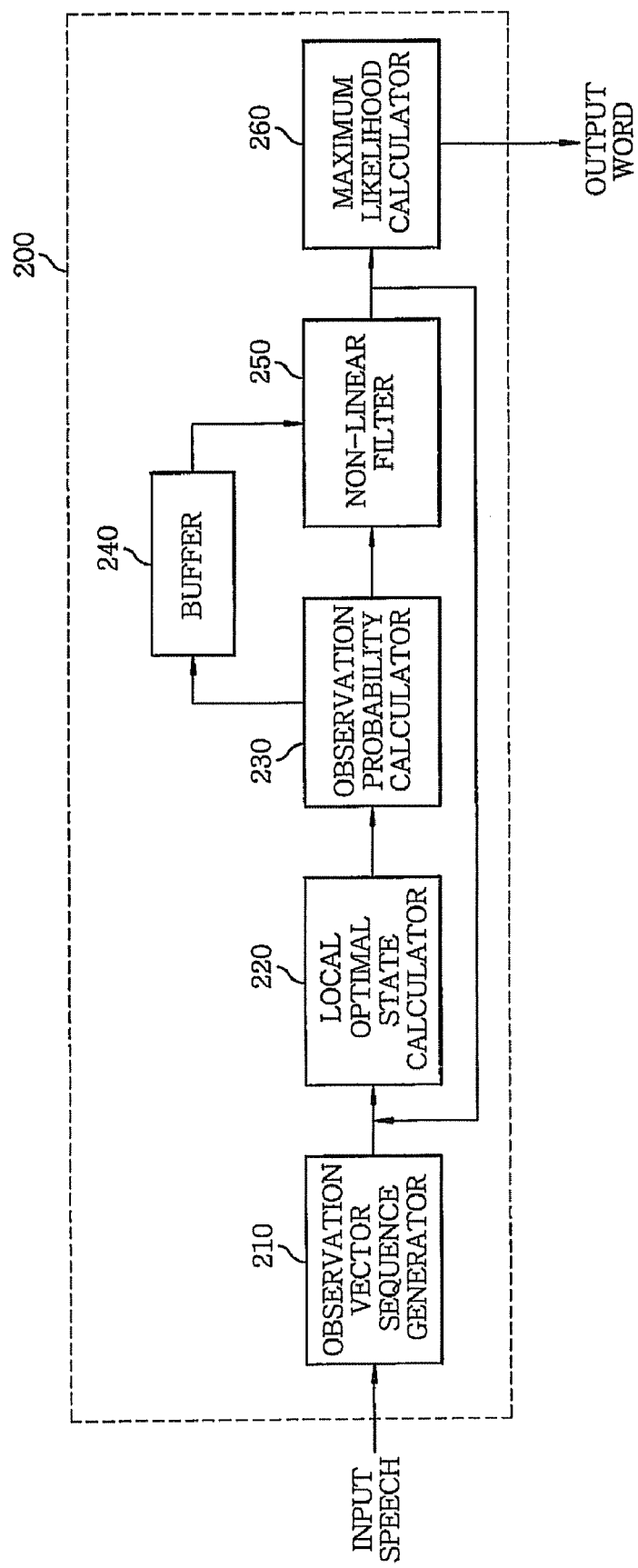
FIG. 2 illustrates a block diagram of a Viterbi decoder in accordance with an embodiment of the present invention.

FIG. 2 illustrates a block diagram of a Viterbi decoder 200 in accordance with an embodiment of the present invention.

The Viterbi decoder 200 measures similarities between an observation vector sequence of an input utterance and preset word models to output, as a recognition result, a word corresponding to a word model having a maximum similarity with the observation vector sequence.

As shown in FIG. 2, the Viterbi decoder 200 includes an observation vector sequence generator 210, a local optimal state calculator 220, an observation probability calculator 230, a buffer 240, a non-linear filter 250 and a maximum likelihood calculator 260.

The observation vector sequence generator 210 generates an observation vector sequence by converting an input speech, i.e., a speech signal, to a sequence of observation vectors.

The local optimal state calculator 220 obtains, among states constituting a hidden Markov model, a partial state sequence having a maximum similarity up to a current observation vector as an optimal state.

The observation probability calculator 230 obtains, as a current observation probability, a probability for observing the current observation vector in the optimal state.

The buffer 240 stores therein a specific number of previous observation probabilities, and is updated using the current observation probability.

The non-linear filter 250 performs a filtering function to reducing side-effects of impulse noises on the speech recognition while taking correlation between consecutive frames in the input speech signal into consideration. To be specific, the non-linear filter 250 calculates a filtered probability to be used in maximum likelihood calculation, based on the current observation probability and the previous observation probabilities stored in the buffer 240. The non-linear filter 250 may be one of a $$\max_K$$

filter, a $$\mathrm{mean}_K$$

filter and a $$\mathrm{median}_K$$

filter respectively performing functions $f(t,K)$ to calculate the filtered probability as in Equations 5 to 7:

$$f(t, K) = \max_K [[b_j(o_{t-K})]^{\gamma(K)}], \qquad \text{Equation 5}$$

$$f(t, K) = \mathrm{mean}_K [[b_j(o_{t-K})]^{\gamma(K)}], \qquad \text{Equation 6}$$

$$f(t, K) = \mathrm{median}_K [[b_j(o_{t-K})]^{\gamma(K)}], \qquad \text{Equation 7}$$

wherein $b_j(o_t\text{-}K)$ is an observation probability in a state j to observe an observation vector $o_{t-K}$ at a frame t-K, and $\gamma(K)$ is a time-varying correlation coefficient function between observation vectors. Further, the function $\gamma(K)$ equals to $c^K$, where c is a correlation coefficient between frames and K is a difference in frame numbers of corresponding two frames.

The $$\max_K$$

filter is a non-linear filter calculates, as the filtered probability, a maximum value of K-1 previous observation probabilities and the current observation probability. The $$\mathrm{mean}_K$$

filter is a non-linear filter calculates, as the filtered probability, a mean value of K-1 previous observation probabilities and the current observation probability. The $$\mathrm{median}_K$$

filter is a non-linear filter calculates, as the filtered probability, a median value of K-1 previous observation probabilities and the current observation probability.

The maximum likelihood calculator 260 calculates a partial maximum likelihood of the optimal state by using the filtered probability received from the non-linear filter 250, and updates a cumulative maximum likelihood by using the partial maximum likelihood. The partial maximum likelihood $\delta_t(j)$ of the state j at the frame t is calculated as in Equation 8:

$$\delta_t(j) = \max_i \lfloor \delta_{t-1}(i) \cdot \alpha_{ij} \rfloor \cdot f(t, K), \qquad \text{Equation 8}$$

wherein $\alpha_{ij}$ is a transition probability to the state j from a state i in the hidden Markov model.

Figure 1:
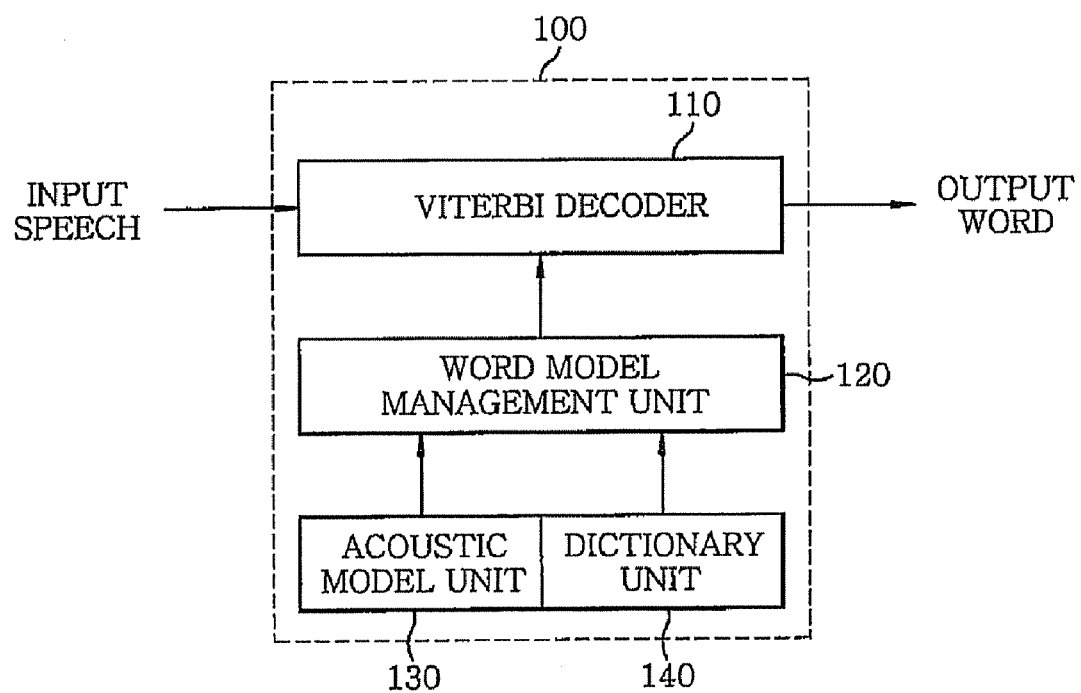
FIG. 1 illustrates a block diagram of a conventional HMM (Hidden Markov Model) based speech recognition system.
Figure 3:
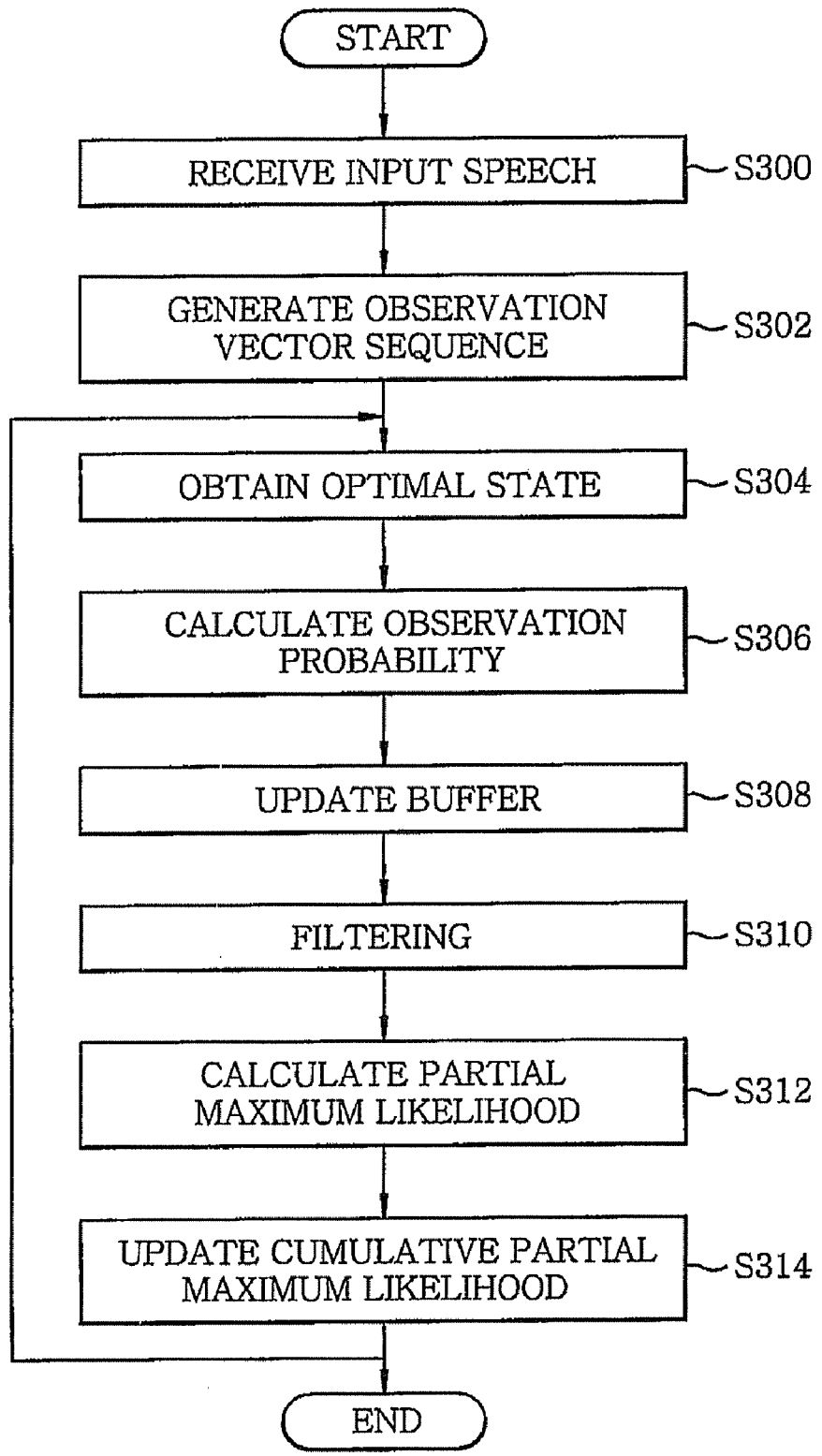
FIG. 3 illustrates a flowchart of a speech recognition method using the Viterbi decoder of FIG. 1.

FIG. 3 illustrates a flowchart of a speech recognition method using the Viterbi decoder 200 of FIG. 1.

First, an input speech is input (step S300).

The observation vector sequence generator 210 generates an observation vector sequence by converting the input speech to a sequence of observation vectors, and provides the observation vector sequence to the local optimal state calculator 220 (step S302).

The local optimal state calculator 220 obtains, among states constituting a hidden Markov model, a partial state sequence having a maximum similarity up to a current observation vector as an optimal state (step S304).

The observation probability calculator 230 obtains, as a current observation probability, a probability for observing the current observation vector in the optimal state obtained by the local optimal state calculator 220 (step S306), and updates the buffer 240 using the current observation probability in the step S306 (step S308).

The non-linear filter 250 performs a filtering by using previous K-1 observation probabilities stored in the buffer 240 and the current observation probability obtained in the step S306 to generate a filtered probability, and provides thus generated filtered probability to the maximum likelihood calculator 260 (step S310). The filtered probability generated in the step S310 may be one of a maximum value, a mean value and a median value of the above-described K observation probabilities, as in Equations 5 to 7, respectively.

The maximum likelihood calculator 260 calculates a partial maximum likelihood by using the filtered probability calculated in the step 310 (step S312) At this time, the maximum likelihood calculator 260 calculates the partial maximum likelihood as in Equation 8.

The maximum likelihood calculator 260 updates a cumulative maximum likelihood by using the partial maximum likelihood calculated in the step S312 (step S314).

The above-described steps S304 to S314 are repeated until it reaches the last observation vector in the observation vector sequence. Then, based on the cumulative maximum likelihood, a word having the maximum similarity is output as a recognition result for the input speech.

While the invention has been shown and described with respect to the embodiments, it will be understood by those skilled in the art that various changes and modification may be made without departing from the scope of the invention as defined in the following claims.

What is claimed is:

1. A Viterbi decoder, comprising:
   a computer executing:
   an observation vector sequence generator for generating an observation vector sequence by converting an input speech to a sequence of observation vectors;
   a local optimal state calculator for obtaining, among states constituting a hidden Markov model, a partial state sequence having a maximum similarity up to a current observation vector as an optimal state;
   an observation probability calculator for obtaining, as a current observation probability, a probability for observing the current observation vector in the optimal state;

a buffer for storing therein a specific number of previous observation probabilities;
a non-linear filter for calculating a filtered probability by using the previous observation probabilities stored in the buffer and the current observation probability; and
a maximum likelihood calculator for calculating a partial maximum likelihood by using the filtered probability,
wherein the non-linear filter uses at least one of following equations to calculate the filtered probability:

$$f(t, K) = \max_K [[b_j(o_{t-K})]^{\gamma(K)}],$$

$$f(t, K) = \operatorname*{mean}_K [[b_j(o_{t-K})]^{\gamma(K)}], \text{ and}$$

$$f(t, K) = \operatorname*{median}_K [[b_j(o_{t-K})]^{\gamma(K)}],$$

wherein $f(t,K)$ is the filtered probability at current time frame t, K is previous time length, $b_j(o_{t-K})$ is an observation probability in a state j to observe an observation vector $o_{t-K}$ at a time frame t-K, and $\gamma(K)$ is a time-varying correlation coefficient function between two time frames, and wherein the function $\gamma(K)$ equals to $c^K$, where $c^K$ is a correlation coefficient between the two time frames and K is a difference in frame numbers of the two frames.

2. The Viterbi decoder of claim 1, wherein the observation probability calculator updates the buffer using the current observation probability.

3. The Viterbi decoder of claim 1, wherein the non-linear filter calculates the filtered probability by using correlations between the previous observation probabilities stored in the buffer and the current observation probability.

4. A speech recognition method using a Viterbi decoder, the method comprising:
generating an observation vector sequence by converting an input speech to a sequence of observation vectors;
obtaining, among states constituting a hidden Markov model, a partial state sequence having a maximum similarity up to a current observation vector as an optimal state;
obtaining, as a current observation probability, a probability for observing the current observation vector in the optimal state;
calculating, by using a non-linear filter, a filtered probability based on previous observation probabilities stored in a buffer and the current observation probability;
calculating a partial maximum likelihood by using the filtered probability;
updating a cumulative maximum likelihood by using the partial maximum likelihood; and
outputting a recognition result for the input speech based on the cumulative maximum likelihood,
wherein said obtaining the optimal state, said obtaining the current observation probability, said calculating the filtered probability, said calculating the partial maximum likelihood and said updating the cumulative maximum likelihood are repeated until it reaches the last observation vector in the observation vector sequence,
wherein the non-linear filter uses at least one of following equations to calculate the filtered probability:

$$f(t, K) = \max_K [[b_j(o_{t-K})]^{\gamma(K)}],$$

$$f(t, K) = \operatorname*{mean}_K [[b_j(o_{t-K})]^{\gamma(K)}], \text{ and}$$

$$f(t, K) = \operatorname*{median}_K [[b_j(o_{t-K})]^{\gamma(K)}],$$

wherein $f(t,K)$ is the filtered probability at current time frame t, K is previous time length, $b_j(o_{t-K})$ is an observation probability in a state j to observe an observation vector $o_{t-K}$ at a time frame t-K, and $\gamma(K)$ is a time-varying correlation coefficient function between two time frames, and wherein the function $\gamma(K)$ equals to $c^K$, where $c^K$ is a correlation coefficient between the two time frames and K is a difference in frame numbers of the two frames.

5. The speech recognition method of claim 4, wherein the filtered probability is calculated by using correlations between the previous observation probabilities and the current observation probability.

* * * * *